(12) United States Patent
Delamarche et al.

(10) Patent No.: US 7,740,472 B2
(45) Date of Patent: Jun. 22, 2010

(54) METHOD AND DEVICE FOR FLOWING A LIQUID ON A SURFACE

(75) Inventors: Emmanuel Delamarche, Thalwil (CH); David Juncker, Zurich (CH); Bruno Michel, Adliswil (CH); Heinz Schmid, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/836,259

(22) Filed: Aug. 9, 2007

(65) Prior Publication Data
US 2008/0000536 A1     Jan. 3, 2008

Related U.S. Application Data

(63) Continuation of application No. 10/537,238, filed on May 31, 2005, now Pat. No. 7,329,111.

(30) Foreign Application Priority Data
Nov. 13, 2003   (WO) ................. PCT/IB2003/005350

(51) Int. Cl.
*B28B 13/00* (2006.01)
*B05C 3/00* (2006.01)
(52) U.S. Cl. ................. 425/449; 425/375; 118/410; 118/411; 118/213
(58) Field of Classification Search ............... 425/449, 425/375; 118/401, 406, 410, 213, 411
See application file for complete search history.

(56) References Cited

U.S. PATENT DOCUMENTS 3,526,694 A     9/1970 Lemelson (Continued)

FOREIGN PATENT DOCUMENTS

EP          0 075 605 A1     9/1981

(Continued)

OTHER PUBLICATIONS

George M. Whitesides, et al, "Soft Lithography in Biology And Biochemistry", Annu. Rev. Biomed. Eng. 2001 pp. 335-373.

(Continued)

*Primary Examiner*—Maria Veronica D Ewald
(74) *Attorney, Agent, or Firm*—Yuanmin Cai

(57) ABSTRACT

A device for flowing a liquid on a surface comprises: a flow path. A first port supplies the liquid to one end of the flow path and applies a first port pressure for retaining the liquid when the flow path is remote from the surface. A second port receives the liquid from the other end of the flow path and applies a second port pressure such that the difference between the first and second negative port pressures is oriented to promote flow of the liquid from the first port to the second port via the flow path in response to the flow path being located proximal to the surface and the liquid in the device contacting the surface. The first and second port pressures are such that the liquid is drawn towards at least the second port in response to withdrawal of the flow path from the surface. Such devices may employ microfluidic technology and find application in surface patterning.

20 Claims, 4 Drawing Sheets

U.S. PATENT DOCUMENTS

| | | | |
|---|---|---|---|
| 6,089,853 | A | 7/2000 | Biebuyck et al. |
| 6,231,333 | B1 | 5/2001 | Gruber et al. |
| 6,326,058 | B1 * | 12/2001 | Biebuyck et al. ............ 427/97.2 |
| 6,488,897 | B2 | 12/2002 | Dubrow et al. |
| 6,629,540 | B2 * | 10/2003 | Mitsumori et al. ...... 134/122 R |
| 6,942,836 | B2 | 9/2005 | Freudenthal et al. |
| 6,951,632 | B2 | 10/2005 | Unger et al. |
| 2002/0117517 | A1 | 8/2002 | Unger et al. |

FOREIGN PATENT DOCUMENTS

| | | |
|---|---|---|
| JP | 2003530566 | 10/2003 |
| JP | 2005506529 | 3/2005 |
| WO | WO 99/56878 | 11/1999 |
| WO | WO 01/63241 A2 | 8/2001 |

OTHER PUBLICATIONS

Mark Schena, "Microarray Biochip Technology", Eaton Publishing 2000.

Jason T. Smith, "Spreading Diagrams for the Optimization of Quill Pin Printed Microarray Density", Langmuir 2002, 18, pp. 6289-6293.

IBM Technical Disclosure Bulletin, reference RD n446 Article 165 p. 1046, "Autonomous Displacement of a Solution in a Microchannel by Another Solution".

Bin Zhao, et al, "Surface-Directed Liquid Flow Inside Microchannels", Science, vol. 291, Feb. 9, 2001, pp. 1023-1026.

* cited by examiner

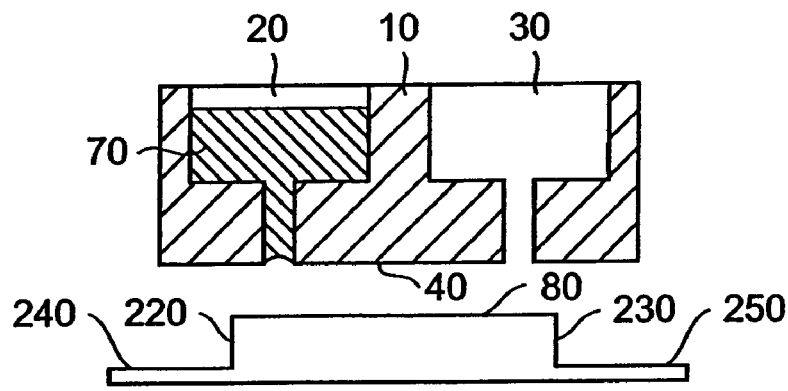
Fig. 13
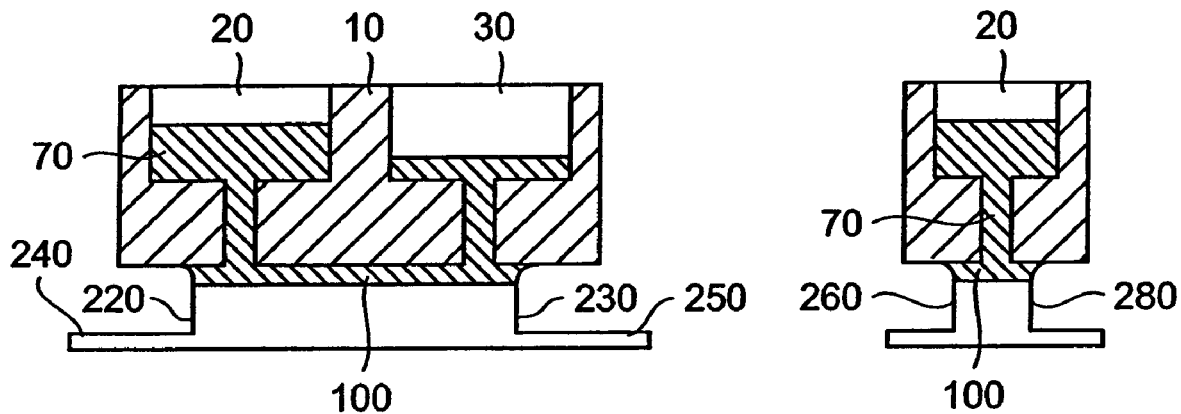
Fig. 14
Fig. 15
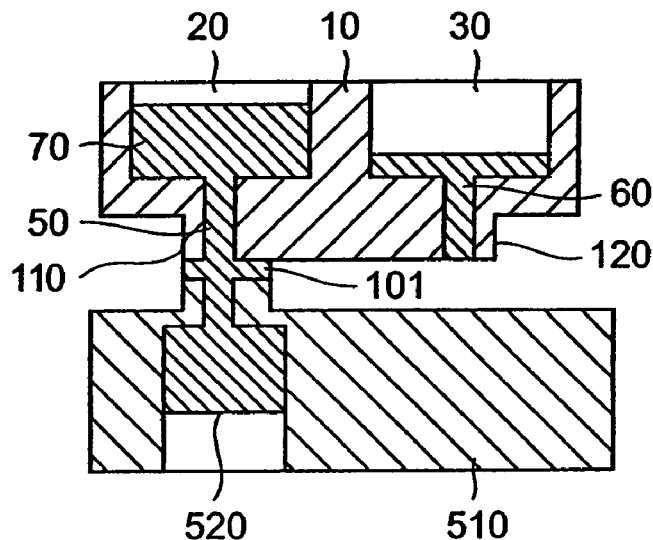
Fig. 16

METHOD AND DEVICE FOR FLOWING A LIQUID ON A SURFACE

CROSS REFERENCE TO RELATED APPLICATIONS

This application is a continuation application of U.S. patent application Ser. No. 10/537,238 filed May 31, 2005, now U.S. patent Ser. No. 7,329,111 issued Feb. 12, 2008 and entitled "Method and Device for Flowing a Liquid on a Surface", which claims priority of a PCT Patent Application Serial No. PCT/IB2003/005350, filed Nov. 13, 2003, which in turn claims priority of European Patent Application No. 02027180.5 filed Dec. 5, 2002, now abandoned. The contents of above applications are incorporated herein by reference in their entirety.

BACKGROUND OF THE INVENTION

The present invention generally relates to a method and device for flowing a liquid on a surface.

There are many applications in which it is desirable to flow a liquid on a surface. An example of such an application is in patterning or other processing of surfaces. Patterning and processing of surfaces with liquids is becoming increasingly important in a range of fields, including chemistry, biology, biotechnology, materials science, electronics, and optics. Patterning a surface by applying a liquid to the surface typically involves confinement of the liquid to defined regions of the surface.

A surface is typically wettable by a liquid if the contact angle between a drop of the liquid and the surface is less than 90 degrees. A channel for carrying a liquid is typically wettable if the channel exerts a negative pressure on the liquid when partially filled. Such a negative pressure promotes filling of the channel by the liquid. In a channel having a homogeneous surface, a negative pressure arises if the contact angle between the liquid and the surface is less than 90 degrees. A surface is typically regarded as more wettable if the contact angle between the surface and the liquid is smaller and less wettable if the contact angle between the surface and the liquid is higher.

One conventional surface patterning technique is lithography. In lithography, a mask is usually applied to the surface to be patterned. Apertures are formed in the mask to define regions of the surface to be exposed for treatment. Those areas of the surface remaining covered by the mask are protected from treatment. The mask is typically formed from a patterned layer of resist material. The surface carrying the mask is then typically immersed in a bath of chemical agents for treating the exposed regions of the surface. Lithography is a relatively expensive process to perform, involving multiple steps. With the possible exception of in situ synthesis of short DNA strands, lithography is generally unsuitable for handling and patterning biomolecules on surfaces. Lithography is also unsuitable for simultaneously processing surfaces with different chemicals in parallel, as described by Whitesides, *Annu. Rev. Biomed.* 3 (2001), 335-373.

There can be incompatibility between different process steps or chemicals used in lithography and between various surface layers processed by lithography.

Another conventional surface patterning technique is drop delivery. Drop delivery systems, such as pin spotting systems, ink jet systems, and the like, typically project a relatively small volume of liquid onto a specific location on a surface. See Shena, M., "*Microarray biochip technology*", Eaton Publishing 2000. However, these systems have limited resolution due to spreading of dispensed drops on the surface. Additionally, the quality of patterns formed by such systems is strongly limited by drying of the delivered liquid, as described by Smith, J. T., "*Spreading Diagrams for the Optimization of Quill Pin Printed Microarray Density*", Langmuir, 18 (2002), p 6289-6293.

These systems are not generally useful for dissolving or extracting materials from a surface. Additionally, these systems do not facilitate a flow of liquid over a surface. Furthermore, these systems are not suited to process a surface sequentially with several liquids.

PCT WO 01/63241 A2 describes a surface patterning technique involving a device having a channel with a discharge aperture. A matching pillar is engaged with the discharge aperture to promote deposition of molecules on the top surface of the pillar. A disadvantage with this device is that it is not possible to vary patterning conditions for different pillars individually. Another disadvantage is that it is not capable of establishing a flow on a surface. Exposure of the surface to the liquid needs to be sufficiently long to allow reagents to reach the surface by diffusion. The method also requires a surface with pillars matching the aperture. Fabrication of such a surface requires expensive clean-room equipment and etching tools. This can increase cost per patterned surface. Precise alignment of the device with the pillars before engagement is required. Additionally, the pillars need pretreatment to ensure the confinement of the liquid. Spacing between the discharge aperture and the pillars needs external control.

Yet another conventional surface patterning technique involves application of a microfluidic device to the surface. An example of such a device is described in U.S. Pat. No. 6,089,853. The device described therein can establish a flow of liquid over a surface. The flow can be created via capillary action in the device. The device can treat a surface with multiple different liquids in parallel. However, the device must be sealed to the surface in the interests of confining the liquid to the region of the surface to be treated. Such confinement allows the formation of patterns with relatively high contrast and resolutions. These are desirable qualities where biomolecules are patterned on a surface for biological screening and diagnostic purposes.

In addition, the device must be placed on the surface to be treated and sealed around the processing regions before it can be filled with treatment liquid. If the flow is created by capillary action, other problems arise. For example, service ports in the device must be filled with treatment liquid for each patterning operation. In addition, only one liquid can be delivered to each channel in the device. The liquid cannot be flushed out of the or each channel before separation of the device from the surface. Furthermore, the treatment liquid tends to spread away from the regions of the surface to be treated during removal of the device from the surface.

Also, the device is not suitable for processing a surface sequentially with several liquids. If the flow is created by external actuation, such as pressurization, electric fields, or the like, then other problems arise. For example, an individual connection from the actuator must be made to each channel in the device. Such connections to peripheral equipment limit the density of channels that can be integrated into the device and individually addressed. Pumping, valving, and control complexity increases as the number of channels increases. External connections create dead volume between the device and external actuators because of the intervening conduits.

Another microfluidic device for localized processing of a surface is described in *IBM Technical Disclosure Bulletin* reference RD n446 Article 165 Page 1046. This device is similar to that described in U.S. Pat. No. 6,09,853. The device permits several liquids to be flushed in sequence over the same surface area without requiring separation of the device from the surface. Such a device is thus useful for chemical and biological reactions involving the sequential delivery of several liquids. A disadvantage associated with this device however is that it must be sealed around the region of the surface to be treated before filling. Another disadvantage is that the liquids cannot be filled prior to application on the device to the surface. Each additional step requires supplementary filling of the relevant liquid. Another disadvantage is that the device cannot be removed from the surface while the service ports contain liquid without liquid spreading over the surface beyond the region to be exposed.

Another conventional device for confining liquids to a predefined pattern between a top and bottom surface without involving a seal is described in European Patent 0 075 605. This device is useful for performing optical analysis of a liquid trapped between the top and bottom surface. However, the device requires predefined topographical or chemical patterns on both the top and bottom surfaces. Also, the device, having no inlet or outlet ports, is not suitable for the transport of liquids.

Another device for guiding liquids along a predetermined path is described in WO 99/56878. This device can flow several liquids simultaneously over a surface without involving seal to confine the liquids. However, a disadvantage of this device is that separation gaps between paths have to be capillary inactive. This limits path sizes to greater than 1 mm. Otherwise meniscus pressures produce uncontrolled spreading of liquid. Another disadvantage of this device is that liquid is not retained after separation and can instead spread over the surface. A further disadvantage of this device is that liquid delivery requires an external connection to each path. Cumbersome peripheral flow control devices are also required.

Yet another method for guiding liquid along a surface without involving a seal is described in Zhao et al., *Science*, Vol. 291 (2001), p. 1023-1026. Here, the surface is patterned with a wettability pattern. Specifically, two wettable paths mirroring each other are defined on otherwise non-wettable top and bottom surfaces. This produces "virtual" channels without lateral walls that can have micrometer width. A disadvantage of this method is that it requires wettability patterns on both the top and bottom surfaces. Additionally, the wettability contrast between the two patterns needs to be very high, and requires both non-wettable areas on the top and bottom surfaces and highly wettable areas within the virtual channel. Furthermore, the two patterns have to match each other exactly in shape and alignment. Capillary action can used to fill the channels, but the liquid cannot be removed or exchanged. This method is also susceptible to uncontrolled spreading of liquid because it is relatively difficult to produce sufficiently non-wettable surfaces. A external pump may be used to deliver the liquid, but if the pump pressure exceeds a relatively low level, liquid will overflow the defined flow path. Furthermore, external pumping requires external connections to each flow path, thus limiting integration. As indicated earlier, external connections create dead volume in pump connecting conduits.

It would be desirable to provide a technique for flowing a liquid over a surface in a more versatile and convenient manner.

BRIEF SUMMARY OF THE INVENTION

In accordance with the present invention, there is now provided a device for flowing a liquid on a surface, the device comprising: a flow path; a first port for supplying the liquid to one end of the flow path and for applying a first port pressure for retaining the liquid when the flow path is remote from the surface; a second port for receiving the liquid from the other end of the flow path and for applying a second port pressure such that the difference between the first and second negative port pressures is oriented to promote flow of the liquid from the first port to the second port via the flow path in response to the flow path being located proximal to the surface and the liquid in the device contacting the surface; and, the first and second port pressures being such that the liquid is drawn towards at least the second port in response to withdrawal of the flow path from the surface.

The devices preferably comprises a protrusion extending into the flow path adjacent the first port for directing the liquid from the first port towards the surface. The protrusion may be formed from a resilient material to prevent damage to the device and/or surface. The device may comprise a peripheral flange surrounding the flow path for sealing the flow path to the surface when the device is proximal to the surface. In a preferred embodiment of the present invention, the device comprises: a first opening communicating between the first port and the flow path for applying a first opening pressure to the liquid in the first port, the first opening pressure being more negative than the first port pressure; and, a second opening communicating between the flow path and the second port for applying a second opening pressure to the liquid in the flow path, the second opening pressure being more negative than the first port pressure.

The device preferably, comprises sides less wettable by the liquid and sides more wettable by the liquid, wherein the flow path is located on a more wettable side surrounded by less wettable sides. In a particularly preferred embodiment of the present invention, the device comprises a body housing the first port and the second port and an extension protruding from the body to form the flow path, the first and second openings being disposed at opposite ends of the extension. Sides of the extension surrounding the flow path are preferably less wettable to the liquid than the flow path. The flow path is thus defined by and located at the extremity of the extension. A surface placed proximal and facing the extremity can form surface channel within the intervening gap. Liquid can be confined and guided within such a surface channel via interfacial tension without a physical seal. This effectively prevents trapping of bubble in the flow path. Entrapment of bubbles can adversely affect the flow rate of liquid. The flow path may be straight or curved.

The first port may comprise a first capillary network for applying the first port pressure. The first capillary network may comprise at least one of a plurality of parallel capillary members, a mesh, a porous material, and a fibrous material. The second port may comprise a second capillary network for applying the second port pressure. The second capillary network may comprise at least one of a plurality of parallel capillary members, a mesh, a porous material, and a fibrous material. The device may comprise a plurality of first ports each coupled to the flow path. Similarly, the device may comprise a plurality of second ports each coupled to the flow path. The flow path may have a curved cross section.

Alternatively, the flow path may have a rectangular cross section. Devices embodying the present invention may be of unitary construction and may be formed from any one of elastomer, silicon, SU-8, photoresist, thermoplastic, ceramic, and metal. Alternatively, devices embodying the present invention may be of layered construction, wherein each layer is formed from one of elastomer, silicon, SU-8, photoresist, thermoplastic, metal, and ceramic. In a particularly preferred embodiment of the present invention, the flow path is approximately 100 micrometers in length and approximately 100 micrometers in width, the volumes of first and second ports are 500 nanoliters each, and, in use, the protrusion defines a spacing between the device and the surface in region of between 5 and 10 micrometers. The first and second port pressures may be such that the liquid is drawn towards the first port and the second port in response to withdrawal of the flow path from the surface. The present invention also extends to an array of applicator devices each as herein before described.

Viewing the present invention from another aspect, there is now provided a method for flowing a liquid on a surface, the method comprising: supplying the liquid from a first port of an applicator device to one end of a flow path of the device; applying to the liquid a first port pressure via the first port; receiving the liquid from the other end of the flow path in a second port of the device; applying to the liquid via the second port a second port pressure different to the first port pressure; promoting, via the difference between the first and second port pressures, flow of the liquid from the first port to the second port via the flow path in response to the flow path being located proximal to the surface and the liquid therein contacting the surface; and, drawing, via the first and second port pressures, the liquid towards at least the second port in response to withdrawal of the flow path from the surface.

The method may comprise, following withdrawal of the flow path from the surface, relocating the device at another position on the surface. Equally, the method may comprise, following withdrawal of the flow path from the surface, relocating the device on another surface. In a preferred embodiment of the present invention, the method comprises contacting the surface with the device and thereafter spacing the device from the surface to define a surface channel between the surface and the flow path for passage of the liquid from the first port to the second port. The method may comprise locating the device in a humid environment to initialize the flow of the liquid from the first port to the second port. The method may also comprise cooling the surface and/or the device to initialize the flow of the liquid via condensation. Alternatively, the method may comprise applying an electric field between the device and the surface to initialize the flow of the liquid from the first port to the second port. Equally, the method may comprise applying a pressure pulse to the liquid to initialize the flow of the liquid from the first port to the second port. Alternatively, the method may comprise applying a heat pulse to the liquid to initialize the flow of the liquid from the first port to the second port via vaporization of the liquid.

In a preferred embodiment of the present invention, the method comprises reversing the direction of flow of the liquid by reversing the pressure difference between the first port and the second port. The method may also comprise drawing, via the first and second port pressures, the liquid towards the first and second ports in response to withdrawal of the flow path from the surface.

In a particularly preferred embodiment of the present invention, there is now provided a device for flowing a liquid over a surface. The device comprises: a flow path; a first port for supplying the liquid to the flow path; a first opening communicating between the first port and one end of the flow path; a second port for receiving the liquid from the flow path; and, a second opening communicating between the other end of the flow path and the second port. In operation, engagement of the device with a surface initiates flow of the liquid from the first port to the second port via the flow path. The flow of liquid is curtailed by disengaging the device from the surface. Thus, the flow of liquid from the first port to the second port can be started and stopped by engaging and disengaging the device with the surface. The flow path acts as an operational fluidic channel when the device is engaged with the surface. This technology is hereinafter referred to as Surface Assisted Liquid Transfer technology or SALT technology. Accordingly, devices and modules based on this technology may be hereinafter referred to as SALT devices. The operational fluidic channel created by engaging the device with the surface will hereinafter be referred to as a surface channel.

In SALT devices embodying the present invention, pressures in the first and second ports need not be varied during operation of the device. This is because engagement of the device with the surface creates a condition in which liquid automatically flows between the first and second ports. This condition can be freely disrupted by disengaging the device from the surface, again without requiring further control of the pressure in either of the first and second ports.

The surface channel initially provides capillary action that transports the liquid from the first opening to the second opening. Thereafter, a pressure difference between first and second ports generates a flow of liquid from the first port to the second port. This effect is suppressed when the device is disengaged from the surface. Thus, the flow of liquid between first and second ports is curtailed. In a preferred embodiment of the present invention, the first port applies a negative pressure, $P1<0$, to the liquid. Similarly, the second port applies a negative pressure to the liquid, $P2<0$, $P2<P1$. The pressure is thus such that the liquid flows from the first port to the second port when the surface channel is active. In a particularly preferred embodiment of the present invention, P1 and P2 are generated by capillary active structures or "capillary pumps". The capillary pumps may comprise capillary networks as herein before described. The volumes of the first and second ports may be commensurate.

An advantage associated with SALT devices is that they can be pre-filled with processing liquids for subsequent repetitive application and removal from areas of surfaces to be processed. Surface processing can be repeated multiple times from the same SALT device without refilling and thus delay. Another advantage associated with SALT devices is that they can deliver a series of different liquids and control the flow of each more easily than in conventional delivery techniques. Yet another advantage associated with SALT devices is that they can be swiftly mass produced via conventional microfabrication techniques. A further advantage of SALT devices is that they can include shallow conduits in processing areas to speed up mass-transport limited chemical reactions. An additional advantage of SALT devices is that they can employ minute amounts of processing reagents without depletion because the flow can be interactively controlled to renew the reagents as necessary.

In typical applications, a SALT device can be placed at an arbitrary location on a surface and process parameters can be controlled via channel dimensions and contact time. Arrays of SALT devices are relatively easy to fabricate. In preferred embodiments of the present invention, flow control is integrated into each SALT device. Such arrays can comprise multiple independent fluidic zones to facilitate parallel processing of multiple areas of a surface with different liquids.

SALT devices may be employed in many applications. For example, SALT devices can be employed to deposit biomolecules in selected regions of a surface to make bio-arrays, thus facilitating mass fabrication of bio-chips. SALT devices can be equally employed in subjecting selected areas of a surface to other processes, such as processes for: repairing pattern defects on a surface; etching specific areas of a surface; depositing metal on a surface; localizing an electrochemical reactions on a surface; depositing catalytic particles for electroless deposition of metals, deposition glass or latex beads or other particles on a surface; passivating specific areas of a surface; patterning proteins, DNA, cells, or other biological entities on a surface; making assays; staining cells; collecting cells, proteins, or other particles from a surface; retrieving analytes or specifically bound biomolecules from arrays on a surface; extracting DNA, proteins, or other molecules from gels; and, coupling collected cells or molecules to an analysis system.

Examples of such an analysis system include liquid chromatography or electrophoresis systems. Devices embodying the present invention may be employed to flow the products of such an analysis system one or more areas of a surface. In other applications, the surface and/or the device may be transparent to permit optical monitoring of the flow and/or optical detection of molecules. In further applications, the surface may contain sensing systems, such as electrodes, membranes, wave guides, and associated transducers to permit detection of molecules in the liquid flowing over the surface. Other processes benefiting from SALT technology will be apparent. SALT devices can also be employed in the delivery of small volumes of samples to test regions formed in a surface. It will thus be appreciated that SALT technology may be employed in the detection of diseases and/or pollutants through the processing of specific areas of a surface.

In accordance with another aspect of the present invention, there is now provided a device for applying a liquid to a surface, the device comprising a well for carrying the liquid, an opening in the well for communicating liquid from the well to the surface via a conduit having outer sides of limited wettability to the liquid.

BRIEF DESCRIPTION OF THE DRAWINGS

Preferred embodiments of the present invention will now be described, by way of example only, with reference to the accompanying drawings, in which:

FIG. 13 is a cross sectional side view of yet another SALT device embodying the present invention;

FIG. 14 is a cross sectional side view of the device shown in FIG. 13 in operation;

FIG. 15 is a cross sectional end view of the device shown in FIG. 13 in operation;

FIG. 16 is a cross sectional side view of a further SALT device embodying the present invention;

DETAILED DESCRIPTION OF THE INVENTION

Figure 1:
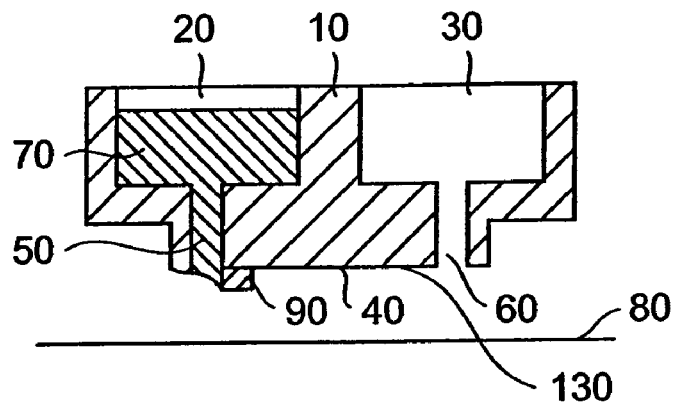
FIG. 1 is a cross sectional side view of a SALT applicator device embodying the present invention carrying a liquid.

Referring first to FIG. 1, an example of a SALT applicator device embodying the present invention comprises a body 10 formed from a material such as PDMS, silicon, SU-8, photoresist, plastics, and metals. A first port 20 and a second port 30 are formed on one side of the body 10. On the other side of the body 10 is narrow extension. A flow path 40 is defined is defined by the base 130 of the extension. The flow path may be straight or curved. A first opening 50 communicates between the first port 20 and one end of the flow path 40. Similarly, a second opening 60 communicates between the second port 30 and the other end of the flow path 40. The flow path 40 thus extends between the first port 20 and the second port 30. In operation, the first port 20 acts as a fill port and the second port 30 acts as a flow promotion port. The liquid 70 is initially introduced to the first port 20.

The first port 20 holds the liquid 70 at pressure P1. P1 is preferably negative. P1<0. This contributes to retaining the liquid 70 in the first port 20. The first opening 50 is wettable to the liquid and provides a capillary or meniscus pressure. This pressure exerts a negative first opening pressure OP1<0 on the liquid 70 in the first port 20. OP1<P1. Therefore, OP1 sucks the liquid from the first port 20 into the first opening 50 towards the flow path 40. The first opening 50 widens at its intersection with the flow path 40. The capillary pressure provided by the first opening 50 is therefore suppressed at this point. A protrusion 90 extends out of the body 10 into the flow path 40 adjacent the first opening 50. The protrusion 90 is wettable by the liquid 70. In operation, the protrusion sucks up the liquid 70 to its tip by capillary force. The protrusion may be resilient to prevent damage to the device or the surface 80. In other embodiments of the present invention, there may be multiple protrusions 90 spaced along the flow path 40 to ensure that the surface channel 100 has uniform depth along its length.

In some cases P1 may vary and may be greater than or equal to 0. This can arise, for example, when the first port 20 is overfilled with the liquid 70. This leads to the liquid 70 having a convex surface. Such a surface is a source of positive pressure albeit of relatively low magnitude. In such a case, the opening 50 is filled with the liquid 70 up to the intersection with the flow path 40 and the protrusion 90. Relatively small dimensions of both the opening 50 and the protrusion 90 are desirable for forming relatively high curvatures in the surface of the liquid 70. By virtue of tension between the liquid and the surrounding medium, such curvatures produce relatively high pressures that confine the liquid 70 within the first port 20 and the opening 50 despite a positive pressure head.

Figure 2:
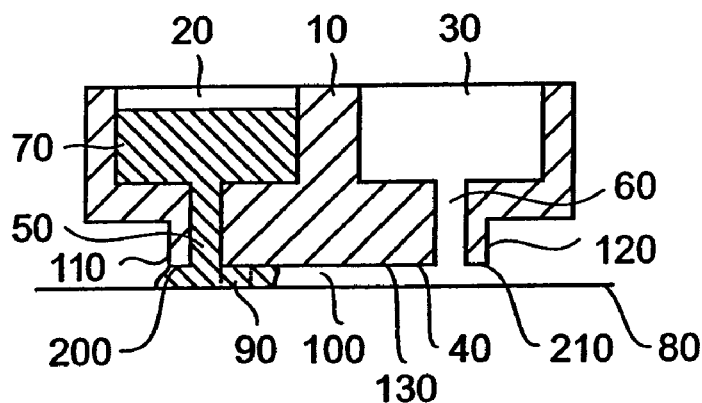
FIG. 2 is a cross sectional side view of the device in contact with a surface with flow of the liquid initiated.

Initiation of flow from the first port 20 to the second port 30 will now be described with reference to FIG. 2. Engagement of the device with the surface 80 creates a surface channel 100 corresponding to the flow path 40. The protrusion 90 abuts the surface 80 to define the size of the surface channel 100, together with the flow path 40. The surface channel 100 provides a capillary pressure, CP, that propels the liquid 70 from the first opening 50 to the second opening 60. CP<P1 and CP<0. The magnitude of CP is determined by the surface tension of the liquid 70, the contact angles of the liquid 70 with the flow path 40 and the surface 80, and the size of the gap formed between the flow path 40 and the surface 80. It is thus possible to tune CP by varying the size of the gap between the surface 80 and the device. The smaller the gap, the higher the magnitude of CP. The larger the gap, the smaller the magnitude of CP.

The surface 80 need not be completely flat, but can be rough, corrugated, porous, fibrous, and/or chemically inhomogeneous. It should also be appreciated that the flow path 40 can be filled with the liquid 70 even if the device is slightly tilted relative to the surface 80. It may be possible to operate the device facing upwardly towards a downwardly facing surface. This may be possible especially where the operational dimensions of the device are very small, such that forces in the liquid interface exceed inertial forces. Gravity does not affect operation of such a device. It may be possible therefore to use such devices in reduced gravity environments.

Confinement of the liquid 70 on the surface 80 is achieved via geometry and wettability of the device. The base 130 of the extension facing the surface 80 is made more wettable by the liquid 70. However, side walls 110-120 of the extension are made less wettable by the liquid 70. The liquid 70 does not spread out because of the right angle between the side walls 110-120 and the surface 80 and because of the less wettable properties of the side walls 110-120. This confines the liquid 70 on the surface 80 to an area roughly corresponding to the area of the flow path 40. Surfaces 200 and 210 of the base 130 are preferably made as small as practical in the interests of minimizing the area of the surface channel 100 which is not subject to flow of the liquid 70.

Confinement of the liquid 70 on highly wettable surfaces is enhanced by positioning the flow path 40 on the extension from the body 10. Further enhancement in liquid confinement is achieved by maximizing the contrast in wettability between the more wettable and less wettable sides of the device. Where applications of interest involve only moderately wettable surfaces, the extension alone may achieve liquid confinement and accordingly the aforementioned wettability contrast may be reduced or omitted. Alternatively, in some applications, the extension from the body 10 may be omitted and liquid confinement achieved by the wettability contrast alone.

Figure 3:
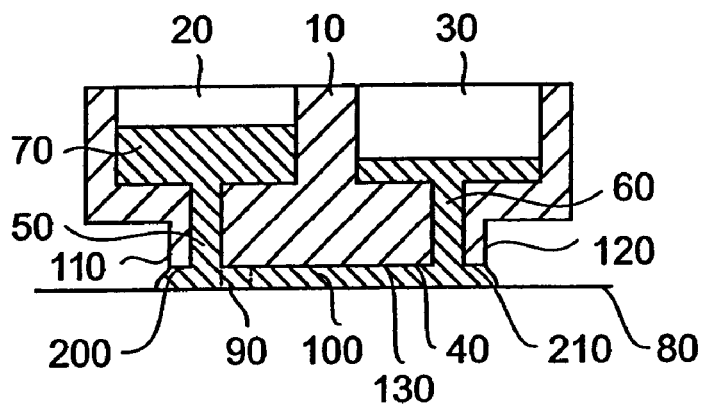
FIG. 3 is a cross sectional side view of the device during flow of the liquid.

Referring to FIG. 3, the second opening 60 provides a capillary or meniscus pressure. This pressure exerts a negative second opening pressure OP2<0 on the liquid 70 in the flow path 40. OP2<P1. Thus, when the liquid 70 reaches the second opening 60, it is drawn into the second opening 60 and propelled toward the second port 30. In turn, the second port 30 exerts a negative pressure P2<0 on the liquid 70. P2<P1. Thus, P2 supports a flow of the liquid 70 from the first port 20 to the second port 30. The flow rate is a function of the ratio (P1–P2)/Fr, where Fr is the flow resistance of the liquid 70 flowing from the first port 20 to the second port 30.

Figure 4:
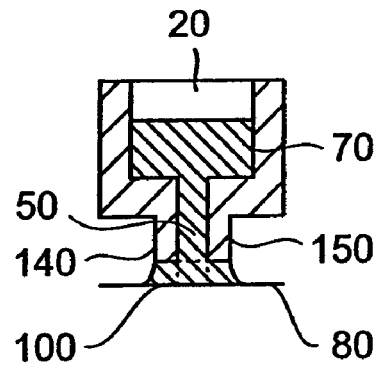
FIG. 4 is a cross sectional end view of the device during flow of the liquid

FIG. 4 shows a cross section through the device in a direction orthogonal to the flow path 40. Similarly to side walls 110-120, side walls 140-150 are less wettable to prevent spreading of the liquid 70 beyond the surface channel 100. The capillary pressure retains the liquid 70 in the surface channel 100.

Figure 5:
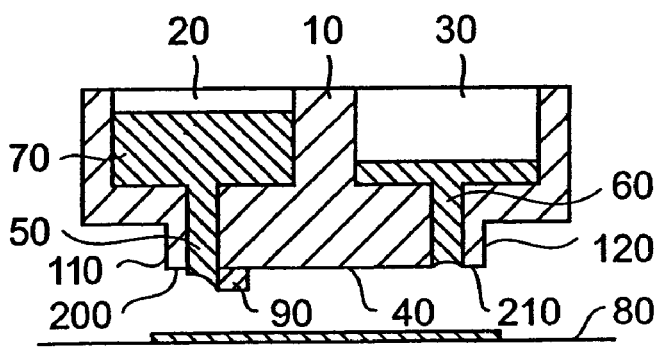
FIG. 5 is a cross sectional side view of the device on removal from the surface.

Referring to FIG. 5, if the gap increases, the magnitude of CP reduces. Eventually, CP reaches a threshold value. Below the threshold value, the liquid in the surface channel 100 drains first into the second port 30 and, provided that P1<0, into the first port 20 shortly thereafter. The drainage causes disruption of the flow of liquid 70 from the first port 20 to the second port 30. The flow of the liquid 70 from the first port 20 to the second port 30 can be curtailed simply by disengaging the device from the surface 80. It is thus possible to initiate flow of liquid 70 from the first port 20 to the second port 30 by engaging the device with the surface 80 and to stop the flow by disengaging the device from the surface 80.

In a particularly preferred embodiment of the present invention, the flow path 40 is around 100 micrometers long and 100 micrometers wide, and the surface channel defining protrusion 90 extends from the base of the device by between 1 and 10 micrometers. The volumes of the first port 20 and the second port 30 are 500 nanoliters each. The depth of the surface channel 100 cannot exceed the width of the surface channel 100. The maximum depth of the surface channel 100 is equal to the width of the surface channel 100. It will appreciated that, in other embodiments of the present invention, SALT devices may have different dimensions.

The liquid 70 may contain treatment agents for processing a particular area of the surface 80. Engaging the device with the surface 80 causes the treatment agent to flow over the region of the surface 80 facing the flow path 40 from the first port 20 to the second port 30. The region of the surface 80 facing the flow path 40 is thus exposed to the treatment agents.

The process herein before described with reference to FIGS. 1 to 5 can be repeated multiple times to treat different regions of the surface 100 or different surfaces. The flow of liquid 70 restarts each time the device engages the surface 80 and stops each time the device is disengaged from the surface 80. The supply of liquid 70 can be replenished as necessary via the first port 20.

The aforementioned treatment agents may be molecules. SALT devices embodying the present invention are thus useful in the bio-patterning of surfaces. However, SALT devices embodying the present invention are not limited in application to delivery of molecules or the like to defined regions of a surface. Other types of liquid may be employed depending on the surface processing desired. SALT devices may be employed to sequentially deliver different treatments to a defined region of a surface. Examples of possible liquids include etchants and the like for producing localized chemical reactions on a surface. Such SALT devices may be reused repetitively, replenishing the supply of liquid as necessary. Process parameters associated with the treatment of the surface can be controlled via pressure difference, liquid viscosity, dimensions of the openings 50 and 60, surface channel dimensions, and contact time.

Figure 6:
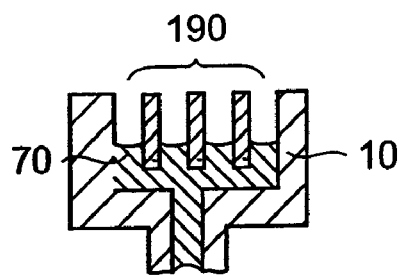
FIG. 6 is a cross sectional end view of an example of a first port for a SALT device embodying the present invention.

Referring to FIG. 6, in a preferred embodiment of the present invention, a first flow controller 130 is provided in the first port 20. In operation, the first flow controller 190 assists in establishing P1. The first flow controller may have many forms. However, in a particularly preferred embodiment of the present invention, the first flow controller 190 comprises a plurality of a capillary members extending into the first port 20. In operation, the capillary members form a capillary network contributing to P1 by exerting capillary action on the liquid 70.

A second flow controller, similar in form to the first flow controller 190, is likewise provided in the second port 30. In operation, the second flow controller assists in establishing P2. The second flow controller may have many forms. However, in a particularly preferred embodiment of the present invention, the second flow controller also comprises a plurality of capillary members extending into the second port 30. The aforementioned capillary members may have circular, hexagonal, square, or rectangular cross sections. Other cross sectional shapes are equally possible.

In embodiments of the present invention herein before described, the first and second flow controllers each comprise capillary members. However, in other embodiments of the present invention, the first and second flow controllers may each comprise a different form of capillary network, such as a network formed from mesh, porous, or fibrous material. Vacuum pumps may be alternatively employed to develop either or both of P1 and P2 in the first port 20 and the second port 30 respectively. Pumps can also permit interactive tuning of the flow of liquid 70 in singular SALT devices or in arrays of SALT devices collectively, individually, or in groups. However, such pumps add complexity to the device.

In a preferred embodiment of the present invention, the direction of flow of the liquid 70 can be selectively reversed by selectively reversing the pressure difference between the first port 20 and the second port 30. Specifically, the P1 can be selectively made greater in magnitude than P2. This can be achieved by, for example, selectively increasing the density of capillary members in the first port 20 by adding additional capillary members or by compressing the first port 20. Alternatively, where P1 and P2 are generated via pumps, the pump pressures can be selectively reversed. Other techniques for reversing the pressure difference between the first port 20 and the second port 30 will be apparent to those skilled in the art.

Figure 7:
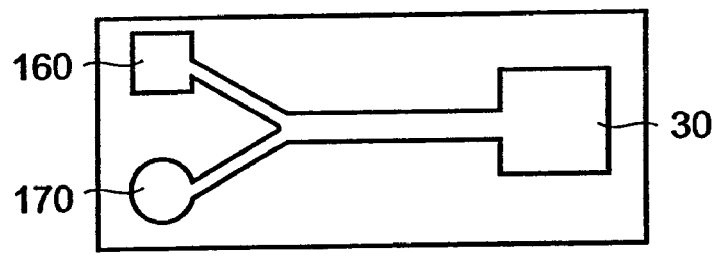
FIG. 7 is a plan view of another example of a SALT device embodying the present invention.

In the preferred embodiments of the present invention herein before described, there is a single first port 20 and a single second port 30. However, referring to FIG. 7, in other embodiments of the present invention, there may be multiple first ports 160-170 coupled to a single second port 30 via a common flow path 40. Different reactive agents may introduced to each of the first ports 160-170 for reaction within the flow path. The flow path 40 may thus act as a reaction chamber activated by proximity of the surface 80. Similarly, there may be a single first port 20 coupled to multiple second ports via a common flow path 40. Equally, there may be multiple first ports coupled to multiple second ports via a common flow path 40.

Figure 8:
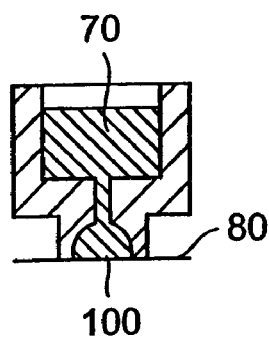
FIG. 8 is a cross sectional end view of a flow path for a SALT device embodying the present invention.

Referring to FIG. 8, in a particularly preferred embodiment of the present invention, the flow path 40 has a curved cross section to prevent unwanted liquid retention, and residual flows between the first port 20 and the second port 30.

Figure 9:
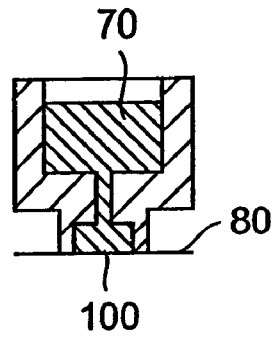
FIG. 9 is a cross sectional end view of a flow path for a another SALT device embodying the present invention.

With reference to FIG. 9, in another preferred embodiment of the present invention, the flow path 40 has a rectangular cross section. This may lead to residual flow along corners of the flow path 40 when separated from the surface 80. Such residual flows may prevent concentration of reagents by evaporation of the liquid 70 from the opening 50. The capillary pressure of the flow path 40 when remote from the surface 80 can be optimized by tuning wettability and geometry together with P1 and P2 to prevent unwanted liquid retention and to limit the residual flow to a desired value.

Figure 10:
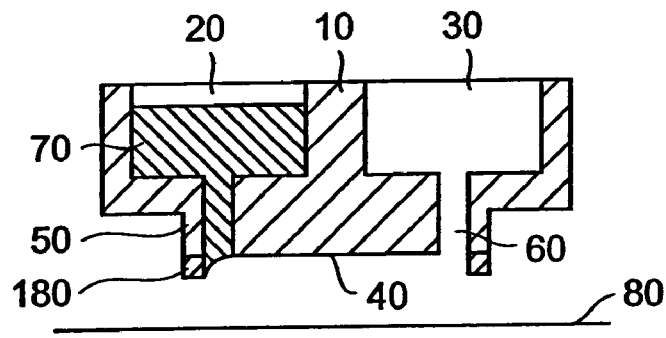
FIG. 10 is a cross sectional side view of another SALT device embodying the present invention.

Referring now to FIG. 10, in a modification of the preferred embodiment of the present invention herein before described with reference to FIG. 1, the flow path 40 is bounded by a peripheral flange 180. In operation, the flange 180 seals to the surface to further prevent the liquid spreading from the flow path 40. The flange 180 also serves to define the thickness of the surface channel 100 formed when the device is engaged with the surface 80. The interior of the flange 180 may be wettable to facilitate contact between the liquid 70 in the first opening 50 and the surface 80 an thus to initiate flow of the liquid 70 between the first port 20 and the second port 30. In such circumstances, the flange 180 performs the function performed by the protrusion 90 in the FIG. 1 embodiment. The protrusion 90 may thus be retained or omitted from the FIG. 9 embodiment. Alternatively, the flange 180 may be held at a small distance from the surface 80 once flow is established for example.

In the preferred embodiments of the present invention herein before described, features defining the surface channel 100, such as the protrusion 90 and the flange 180 are integrated into the device. It will be appreciated however that, in other embodiments of the present invention, features defining the surface channel 100 may be provided by formations of the surface 80.

Figure 11:
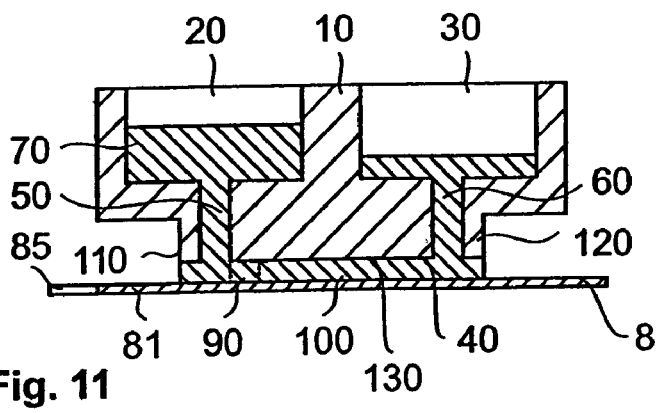
FIG. 11, is a cross sectional side view of a SALT device embodying the present invention used in combination with a patterned surface.
Figure 12:
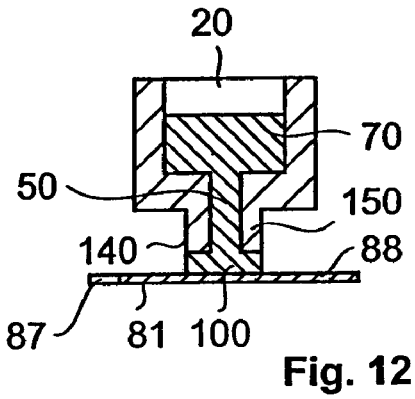
FIG. 12, is a cross sectional end view of the device used in combination with the patterned surface.

With reference to FIGS. 11 and 12 in combination, in a preferred embodiment of the present invention, a device as herein before described may be aligned with a surface 80 patterned with more wettable areas 81 surrounded by less wettable areas 85-88. The flow path 40 and the more wettable area 81 are matched in size and aligned with each other to define the surface channel 100. The less wettable areas 85-88 help confine the liquid 70 in the surface channel 100, which is the region perpendicular to the flow path 40. It will be appreciated that defining the surface channel 100 by more wettable areas 81 that match and can be aligned with the flow path 40 increases flexibility in design of the device and relaxes constraints of the level of wettability contrast.

In the preferred embodiments of the present invention herein before described, flow initialization is effected by the protrusion 90 or by the flange 180. However, in other embodiments of the present invention, flow of the liquid 70 along the flow path 40 may be initialized by other techniques. For example, in another embodiment of the present invention, the device has no protrusion 90 or flange 180 adjacent the first opening 40. To initialize flow of the liquid 70, the base of the device is first brought into contact with the surface 80 so that the liquid 70 in the first opening contacts and wets the surface 80. The device is then withdrawn from the surface to a distance equal to the desired depth of the surface channel 100. Capillary pressure in the surface channel 100 then transports liquid from the first port 20 to the second port 30 until the liquid reaches the second port 30, whereupon the pressure difference between the first port 20 and second port 30 maintains the flow.

Referring to FIG. 13, this technique is particularly useful for flowing the liquid over a raised area of the surface 80.

Referring to FIGS. 14 and 15 in combination, in this embodiment of the present invention, the side walls 220-230 and 260-280 of the raised area and the surrounding region 240-250 of the surface 80 are non-wettable by the liquid 70. Thus, the raised area of the surface channel 80 together with the flow path 40 of the device define the surface channel 100. It will be appreciated that a protrusion may be provided on the raised area of the surface 80 to help initiate flow. Comparing this embodiment of the present invention with that herein before described with reference to FIG. 1, it will be appreciated defining the surface channel via a raised area of the surface increases flexibility in design of the device.

With reference now to FIG. 16, in a preferred embodiment of the present invention, the first port 20 and/or second port 30 of the device may be loaded and/or unloaded with the liquid 70 from below via the openings 50 and 60. Lids may be provided to close the first port 20 and the second port 30. The lids may be permanently sealed so that liquid can be introduced to the device via the openings 50 and 60 alone. The openings 50 and 60 may likewise be provided with lids to prevent evaporation during periods of nonuse. A reservoir device 510 comprising a reservoir 520 for the liquid 70 may be provided for filling, refilling, and draining the applicator device. The reservoir device facilitates loading and unloading of the first port 20 and the second port 30 of the applicator device independently without requiring removal of the lid. In operation, the reservoir device 510 forms a flow path 101 between the reservoir 520 and the first port 20 or the second port 30 depending on location of the reservoir device 510 relative to the applicator device.

Embodiments of the present invention have been described herein with reference to a SALT applicator device having less wettable and more wettable surfaces. The initiation and confinement of the flow of the liquid 70 is achieved and controlled via synchronization of pressures exerted on the liquid 70 at different locations, such as in the first and second ports 20-30, in the opening 50-60, and along the flow path 40. The confinement of the liquid 70 by interfacial tension is a function of surface wettability and geometrical parameters in combination. The confinement pressure involved can be achieved by only a small wettability difference between faces of the device, or, in some cases, with zero wettability difference. This is possible because the geometry of the device and/or surface can be employed to confine the liquid 70. Preferable confinement conditions can be obtained by superposing a wettability pattern on top of the geometry. The confinement conditions can be calculated analytically by taking into account contact angles of the liquid 70 with the faces, surface tension in the liquid, pressures and flow rates.

In another embodiment of the present invention, flow initialization is achieved by located the device proximal to the surface 80 in a humid environment. In this arrangement, the device and/or the surface may be initially cooled down to promote condensation, thereby further stimulating flow. Alternatively, an electric field may be applied between the device and the surface in the interests of stimulating the liquid 70 in the first opening 50 to contact the surface 80. Similarly, a pressure pulse may be applied to the liquid 70 in the first opening 50 likewise to stimulate contact with the surface 80. Alternatively, a heat pulse may be applied to the liquid 70 to initialize the flow of the liquid from the first port 20 to the second port 30 via vaporization of the liquid 70.

Figure 17:
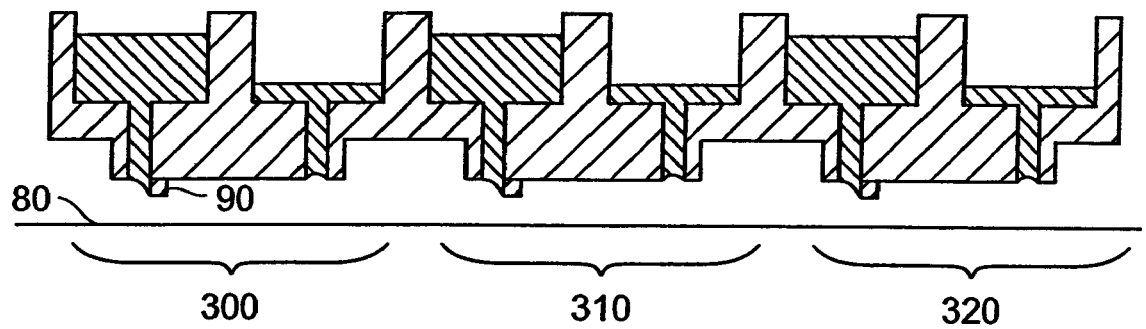
FIG. 17 is a cross sectional side view of a SALT array embodying the present invention.
Figure 18:
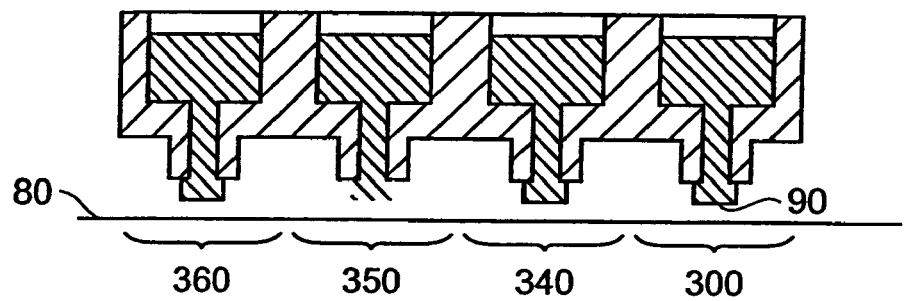
FIG. 18 is a cross sectional end view of the SALT array.

Preferred embodiments of the present invention have been herein before described with reference to a single SALT device. However, it will be appreciated that many such devices may integrated to form a SALT array. Referring to FIGS. 17 and 18 for example, 12 such SALT devices may be integrated into a single 3×4 SALT array of devices. It will be appreciated that many different configurations of SALT array are possible, involving different numbers of SALT devices.

Figure 19:
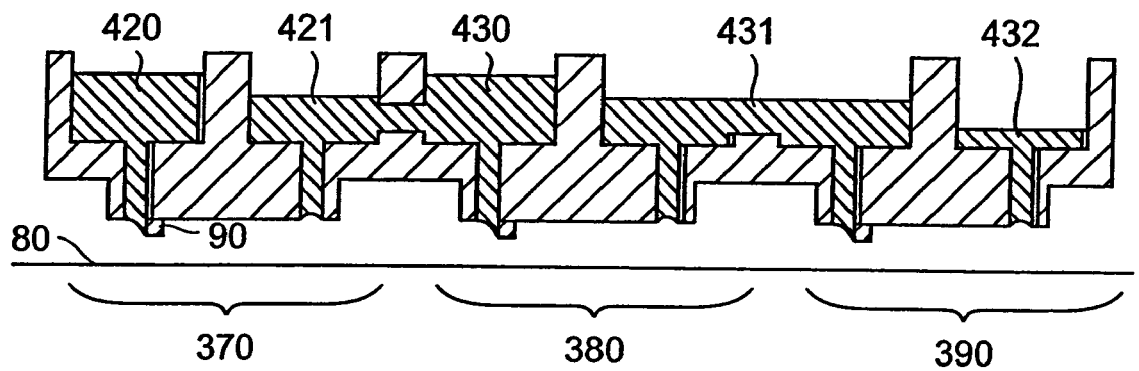
FIG. 19 is a cross section side view of an interconnected SALT array embodying the present invention.

Referring now to FIG. 19, in yet another embodiment of the present invention, the ports of several SALT devices 370-390 are interconnected t form a cascade of SALT devices. By generating a less negative pressure in port 420 and a most negative pressure in port 432, liquid flows from port 420 via a first surface channel to port 421, and from port 421 via an interconnection to port 430. From port 430, the liquid flows via a second surface channel to port 431, and from port 431 the liquid flows via a third surface channel to port 432. In a particularly preferred embodiment of the present invention, each of the ports 420-432 forms a reaction chamber in which the liquid reacts. The product of such reactions may be analyzed in each of the ports 421 and 431 or in the final port 432 on completion of the reaction. Alternatively, the product of such reactions may be analyzed on the surfaces 370-390. In another alternative, the products of such reactions may be used to treat or react with the surfaces 370-390.

Preferred embodiments of the present invention have been herein before described with reference to a SALT device having a body 10 formed from an elastomeric or rigid material. Such materials can be shaped by well-known microfabrication techniques, such as photolithography, etching, injection molding and the like. Embodiments present invention based on such materials may be of unitary construction However, it will also be appreciated that the present invention may be implemented by an assemblage of multiple parts. For example, embodiments of the present invention may also be of a layered assembly. Each layer may formed from a different material such as elastomer, silicon, SU-8, photoresist, thermoplastics, ceramic, and metal.

Placement of a device embodying the present invention relative to a surface may be achieved via a manipulator. Such a manipulator may be manually controlled or automatically controlled via a programmable computer or similar electronic control system. Such a manipulator may act upon the device, the surface or both, providing control of in plane and/or out of plane translational and/or rotational motions. Such manipulators may permit an increase in frequency with which one or more applicator devices embodying the present invention may be engaged with a surface concurrently.

The invention claimed is:

1. A device for flowing a liquid on a surface, the device comprising:
   a flow path;
   a first port at a first end of the flow path for supplying the liquid to the flow path and for applying a first port pressure for retaining the liquid when the flow path is remote from the surface;
   a second port at a second end of the flow path for receiving the liquid from the flow path and for applying a second port pressure such that the difference in pressure between the first and second port is oriented to promote flow of the liquid from the first port to the second port via the flow path in response to the flow path being located proximal to the surface and the liquid in the device contacting the surface; and
   a protrusion adjacent to the first port and extending into the flow path for directing the liquid from the first port towards the surface,
   wherein the first and second port pressures being such that the liquid is drawn towards at least the second port in response to withdrawal of the flow path from the surface.

2. A device as claimed in claim 1, wherein the protrusion is resilient.

3. A device as claimed in claim 1 comprising a peripheral flange surrounding the flow path for sealing the flow path to the surface when the device is proximal to the surface.

4. A device as claimed in claim 1 comprising:
   a first opening communicating between the first port and the flow path for applying a first opening pressure to the liquid in the first port, the first opening pressure being more negative than the first port pressure; and,
   a second opening communicating between the flow path and the second port for applying a second opening pressure to the liquid in the flow path, the second opening pressure being more negative than the first port pressure.

5. A device as claimed in claim 4, comprising sides less wettable by the liquid and sides more wettable by the liquid, wherein the flow path is located on a more wettable side surrounded by less wettable sides.

6. A device as claimed in claim 4, comprising a body housing the first port and the second port and an extension protruding from the body to form the flow path, the first and second openings being disposed at opposite ends of the extension.

7. A device as claimed in claim 6, wherein sides of the extension surrounding the flow path are less wettable to the liquid than the flow path.

8. A device as claimed in claim 1, wherein the first port comprises a first capillary network for applying the first port pressure.

9. A device as claimed in claim 8, wherein the first capillary network comprises at least one of a plurality of parallel capillary members, a mesh, a porous material, and a fibrous material.

10. A device as claimed in claim 1, wherein the second port comprises a second capillary network for applying the second port pressure.

11. A device as claimed in claim 10, wherein the second capillary network comprises at least one of a plurality of parallel capillary members, a mesh, a porous material, and a fibrous material.

12. A device as claimed in claim 1 comprising a plurality of first ports each coupled to the flow path.

13. A device as claimed in claim 1 comprising a plurality of second ports each coupled to the flow path.

14. A device as claimed in claim 1 wherein the flow path has a curved cross section.

15. A device as claimed in claim 1 wherein the flow path has a rectangular cross section.

16. A device as claimed in claim 1, formed from a material selected from the group consisting of elastomer, silicon, SU-8, photoresist, thermoplastic, ceramic, and metal.

17. A device as claimed in claim 1 of layered construction.

18. A device as claimed in claim 17, wherein each layer is formed from a material selected from the group consisting of elastomer, silicon, SU-8, photoresist, thermoplastic, metal, and ceramics.

19. A device as claimed in claim 1, wherein the flow path is approximately 100 micrometers in length and approximately 100 micrometers in width, the volumes of first and second ports are 500 nanoliters each, and, in use, the protrusion defines a spacing between the device and the surface in region of between 1 and 10 micrometers.

20. A device as claimed in claim 1, wherein the first and second port pressures are such that the liquid is drawn towards the first port and the second port in response to withdrawal of the flow path from the surface.

* * * * *